United States Patent
Zhang et al.

(10) Patent No.: US 10,448,291 B2
(45) Date of Patent: Oct. 15, 2019

(54) METHOD AND APPARATUS FOR FACILITATING MOBILITY IN A COMMUNICATIONS NETWORK

(71) Applicant: Telefonaktiebolaget LM Ericsson (publ), Stockholm (SE)

(72) Inventors: Zhang Zhang, Beijing (CN); Qianxi Lu, Beijing (CN); Rui Fan, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 15/565,507

(22) PCT Filed: Apr. 16, 2015

(86) PCT No.: PCT/CN2015/076756
§ 371 (c)(1),
(2) Date: Oct. 10, 2017

(87) PCT Pub. No.: WO2016/165108
PCT Pub. Date: Oct. 20, 2016

(65) Prior Publication Data
US 2018/0160344 A1    Jun. 7, 2018

(51) Int. Cl.
*H04L 12/707* (2013.01)
*H04W 36/00* (2009.01)
(Continued)

(52) U.S. Cl.
CPC ....... *H04W 36/0077* (2013.01); *H04W 36/02* (2013.01); *H04W 72/0426* (2013.01); *H04W 84/045* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 8,179,792 B1 | 5/2012 | Doerr et al. | |
| 2003/0169716 A1* | 9/2003 | Saito | H04W 36/18 370/338 |

(Continued)

FOREIGN PATENT DOCUMENTS

| | | |
|---|---|---|
| CN | 100433925 C | 11/2008 |
| EP | 1320274 A2 | 6/2003 |

(Continued)

OTHER PUBLICATIONS

PCT International Search Report for International application No. PCT/CN2015/076756—dated Jan. 21, 2016.
(Continued)

*Primary Examiner* — Sithu Ko
(74) *Attorney, Agent, or Firm* — Patent Portfolio Builders, PLLC (57) ABSTRACT

Embodiments of the present disclosure propose a method and an apparatus for facilitating mobility in an ultra-dense network, e.g. mmW network. Particularly, there is provided a method at a network node for facilitating mobility in a communications network. The method comprises transmitting duplicates of data received from an upper level network node and directed to a terminal device served by a first lower level network node to the first lower level network node and a second lower level network node for buffering. The method also comprises receiving a status report from the first lower level network node indicating that the data is successfully received at the terminal device. The method further comprises generating a data discarding command according to the status report and signaling the data discarding command to the second lower level network node so that the duplicate of the data buffered at the second lower level network node is discarded according to the data discarding command.

14 Claims, 7 Drawing Sheets

(51) Int. Cl.
*H04W 72/04* (2009.01)
*H04W 84/04* (2009.01)
*H04W 36/02* (2009.01)
*H04L 5/00* (2006.01)

(56) References Cited

U.S. PATENT DOCUMENTS

| | | | | |
|---|---|---|---|---|
| 2007/0206621 | A1* | 9/2007 | Plamondon | H04L 1/1887 370/413 |
| 2008/0089287 | A1* | 4/2008 | Sagfors | H04W 36/026 370/331 |
| 2009/0052412 | A1* | 2/2009 | Kumar | H04W 36/02 370/338 |
| 2009/0238140 | A1* | 9/2009 | Kojima | H04L 45/24 370/331 |
| 2010/0118781 | A1* | 5/2010 | Petrovic | H04L 1/1887 370/328 |
| 2010/0284365 | A1* | 11/2010 | Sundell | H04W 36/0066 370/331 |
| 2010/0322194 | A1* | 12/2010 | Hu | H04W 36/023 370/331 |
| 2013/0188555 | A1 | 7/2013 | Olsson et al. | |
| 2014/0086132 | A1* | 3/2014 | Liu | H04W 80/04 370/312 |
| 2014/0098747 | A1* | 4/2014 | Jonsson | H04L 1/02 370/328 |

FOREIGN PATENT DOCUMENTS

| | | |
|---|---|---|
| WO | 2005/115038 A1 | 12/2005 |
| WO | 2013/143084 A1 | 10/2013 |

OTHER PUBLICATIONS

PCT Written Opinion of the International Searching Authority for International application No. PCT/CN2015/076756—dated Jan. 21, 2016.

Extended European Search Report issued in corresponding EP Application No. 15888813.1; dated Sep. 11, 2018; 10 Pages.

* cited by examiner

FIG. 1

PRIOR ART

METHOD AND APPARATUS FOR FACILITATING MOBILITY IN A COMMUNICATIONS NETWORK

PRIORITY

This nonprovisional application is a U.S. National Stage Filing under 35 U.S.C. § 371 of International Patent Application Serial No. PCT/CN2015/076756 filed Apr. 16, 2015, and entitled "METHOD AND APPARATUS FOR FACILITATING MOBILITY IN A COMMUNICATIONS NETWORK" which is hereby incorporated by reference in its entirety.

TECHNICAL FIELD

The non-limiting and exemplary embodiments of the present disclosure generally relate to the communications field, and specifically to a method, an apparatus, and a computer program for facilitating mobility in a communications network, particularly an ultra-dense network, e.g. a millimeter-wave (mmW) network.

BACKGROUND

This section introduces aspects that may facilitate better understanding of the present disclosure. Accordingly, the statements of this section are to be read in this light and are not to be understood as admissions about what is in the prior art or what is not in the prior art.

The ultimate goal of mobile broadband is ubiquitous and sustainable provision of non-limiting data rates to any person or any terminal at any time. In order to achieve this goal, Ultra-Dense Networks (UDNs) become an important solution after the successful introduction of Long Term Evolution (LTE) for wide-area and local-area access. Through overprovision and related low average loads in an access network, UDNs may create ubiquitous access opportunities which, even under a realistic assumption on user density and traffic, provide users with desired data rates.

Overprovision is achieved by an extremely dense grid of access nodes (ANs). Inter-access-node distances in the order of tens of meters or below may be envisioned, and indoor deployments of one or even multiple access nodes are conceivable in each room. In addition to the increased network capacity, densification—via reduced transmit power—also offers access to vast spectrum holdings in millimeter-wave (mmW) bands and thus the increased data rates.

For example, a several-gigahertz (GHz) spectrum is available in the unlimited 60 GHz band and potentially more in other millimeter-wave bands, enabling multi-Gb/s transmission even with technologies providing moderate spectral efficiency. While schemes with moderate spectral efficiency may be perceived as old-fashioned, they offer robustness and energy efficient data transmission. Furthermore, there are some implementation issues at higher millimeter-wave frequencies that make it very challenging to provide high spectral efficiency. In this sense, the spectral efficiency may be traded for bandwidth.

Figure 1:
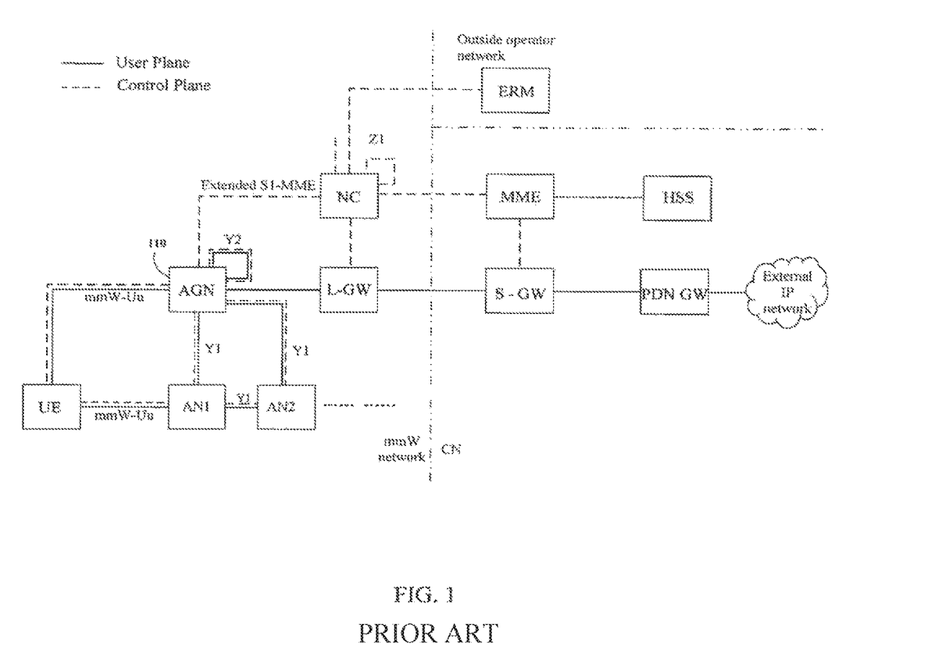
FIG. 1 illustrates a logical architecture and interface for an example mmW network.

FIG. 1 illustrates a logical architecture and interface for an example mmW network. As illustrated in this figure, ANs (only two are shown in FIG. 1) are connected with an aggregation node (AGN) via a wireless interface Y1 and the AGN is connected to a network controller (NC) and a local gateway (LGW) via a fixed interface, e.g. extended S1-Mobility Management Entity (MME). The NC is a control node within the mmW network, which is responsible for spectrum selection, routing and resource allocation, etc. The LGW is a user plane node within the mmW network, which has a connection with the external core network.

Since the density of ANs within an mmW network is very high, a user equipment (UE) may have to frequently switch from one AN/AGN to another AN/AGN. The traditional handover procedure defined in LTE is therefore not suitable for mmW networks, which involve relatively complex signaling and take relatively longer time. It would be a great advantage that the whole mmW network looks like an evolved NodeB (eNodeB or eNB) from the external core network point of view, so that UE mobility within the mmW network may be treated using the Radio Resource Management (RRM) protocol. In order to support this requirement, data packet delivery within the mmW network may be done at the radio link control (RLC) layer using the relay Automatic Repeat reQuest (ARQ) mechanism, in which each link hop operates at the physical (PHY)/Media Access Control (MAC) layer, and the end-to-end connection (from AN/AGN to NC or LGW) operates at the Radio Resource Control (RRC) layer for the control plane or at the Packet Data Convergence Protocol (PDCP) layer for the user plane.

The UE mobility procedure within an mmW network is needed when a UE switches from one AN to another AN in the mmW network, especially when the two ANs have no direct connection in between. In this case, the routing path for the UE within the mmW network needs to be changed and the NC must be involved. The traditional handover like procedure is not suitable in the mmW network, as the source AN needs to know the neighborhood relationship with the target AN and needs to establish a forwarding tunnel toward the target AN for context information and data packets. This implies a heavy burden and overhead on each AN.

Instead, the mobility management may be controlled by the NC. The NC is a central control node in an mmW network and thus knows the whole network topology. When a UE is connecting with a source AN, it reports measurement results to the NC. Then the NC can determine if another AN neighboring to the source AN may become a target AN for serving the UE or not. If the UE needs to switch to the target AN, different from the traditional handover procedure, the source AN may not be required to transfer the UE context to the target AN, according to an existing solution proposed in a Patent Cooperation Treaty (PCT) application No. PCT/CN2014/094133. Instead, the target AN obtains the necessary context information from the UE and the NC. The context information to be acquired from the UE may be UE network capability, packet status information, UE historical information, etc. The context information to be acquired from the NC may be QoS related information.

However, for a large-size network, with the centralized control, RRC signaling may have to transmit back and forth over multi-hops with the NC to trigger data plane switching at the LGW during UE switching, this may increase latency in both the control plane and the data plane, consequently causing degraded performance and end user's experience. Besides, in order to have lossless mobility, the LGW needs to retransmit data packets that the UE does not receive from the source AN to the target AN over a new path after the switching procedure, i.e. the transmission starts to be carried out on the new path. This may further increase the latency and degrade system performance.

SUMMARY

Various embodiments of the present disclosure mainly aim at providing an efficient solution for facilitating mobility in an ultra-dense network, e.g. mmW network. Other features and advantages of embodiments of the present disclosure will also be understood from the following description of specific embodiments when read in conjunction with the accompanying drawings, which exemplarily illustrate the principles of embodiments of the present disclosure.

In a first aspect of the disclosure, there is provided a method for facilitating mobility in a communications network, e.g. an mmW network. This method may be performed at a network node, e.g. an LGW, an AGN, an access node, or a proxy for processing user plane data (which will be referred to as UP proxy in the following description). The method comprises transmitting duplicates of data received from an upper level network node and directed to a terminal device served by a first lower level network node to the first lower level network node and a second lower level network node for buffering and then receiving a status report from the first lower level network node indicating that the data is successfully received at the terminal device. Afterwards, a data discarding command is generated according to the status report and then signaled to the second lower level network node so that the duplicate of the data buffered at the second lower level network node is discarded according to the data discarding command. In an embodiment, the data discarding command may be signaled periodically. In another embodiment, the data discarding command may be signaled to the second lower level network node during switching of the terminal device from the first lower level network node to the second lower level network node.

In an embodiment, the generation of the data discarding command may be further based on one or more of the following: overhead on a link between the network node and the second lower level network node, a required update speed at the second lower level network node, an attribute of the data directed to the terminal device, a load status of the terminal device, and channel quality of the terminal device.

In an embodiment, the method may further comprise discarding the data that is successfully received at the terminal device as indicated by the status report and also reporting to the upper level network node that the data is successfully received at the terminal device.

In an embodiment, the first lower level network node may be an access node directly serving the terminal device or a network node between the upper level network node and an access node directly serving the terminal device.

In an embodiment, the data discarding command may comprise information indicating a starting point from which the data will be transmitted to the terminal device.

In a second aspect of the present disclosure, there is provided a method for facilitating mobility in a communications network, e.g. an mmW network. The method is performed at an access node. The method comprises buffering data transmitted from an upper level network node and directed to a first terminal device served by another access node and discarding the buffered data according to a data discarding command received from the upper level network node. The data discarding command may be generated at the upper level network node based on a status report from the other network node indicating that the data is successfully received at the first terminal device.

In an embodiment that the access node itself also serves another terminal device, i.e. a second terminal device, the method may further comprise buffering data transmitted from the upper level network node and directed to the second terminal device. The method may also comprise discarding the buffered data, in response to receiving an acknowledgement from the second terminal device and reporting to the upper level network node a reception status of the data at the second terminal device based at least on the received acknowledgement.

In a third aspect of the present disclosure, there is provided an apparatus for facilitating mobility in a communications network. This apparatus may be embodied as a network node or a part thereof, e.g. an LGW, an AGN, an access node, or a proxy for processing user plane data. The apparatus comprises a transmitting unit, a receiving unit, a generating unit and a signaling unit. The transmitting unit is configured to transmit duplicates of data received from an upper level network node and directed to a terminal device served by a first lower level network node to the first lower level network node and a second lower level network node for buffering. The receiving unit is configured to receive a status report from the first lower level network node indicating that the data is successfully received at the terminal device. The generating unit is configured to generate a data discarding command according to the status report, while the signaling unit is configured to signal the data discarding command to the second lower level network node so that the duplicate of the data buffered at the second lower level network node is discarded according to the data discarding command.

In a fourth aspect of the present disclosure, there is provided an apparatus for facilitating mobility in a communications network. The apparatus is embodied as an access node or a part thereof. The apparatus comprises a buffering unit that is configured to buffer data transmitted from an upper level network node and directed to a first terminal device served by another access node and a discarding unit that is configured to discard the buffered data according to a data discarding command received from the upper level network node.

In a fifth aspect of the present disclosure, there is provided an apparatus for facilitating mobility in a communications network. The apparatus comprises a processor and a memory. The memory containing instructions executable by the processor, whereby the apparatus is operative to perform the method according to the first or second aspect of the present disclosure.

In a sixth aspect of the present disclosure, there is provided an apparatus for facilitating mobility in a communications network. The apparatus comprises processing means adapted to perform the method according to the first or second aspect of the present disclosure.

In a seventh aspect of the present disclosure, there is provided a computer program. The computer program comprises instructions which, when executed on at least one processor, cause the at least one processor to carry out the method according to the first or second aspect of the present disclosure.

According to the various aspects and embodiments as mentioned above, an efficient solution is provided for facilitating mobility in an ultra-dense network, e.g. mmW network with a pre-buffering scheme. By virtue of this solution, data for transmission to a terminal device may be ready at a target access node before the terminal device is actually switched to it and thus the latency for data transmission after the switching may be reduced. Furthermore, according to the information from an upper level network node, e.g. a data discarding command, the target access node may clearly know the starting point from which the data shall be delivered to the terminal device. Moreover, the data that has already been successfully received by the terminal device may be properly discarded from the buffer at the target access node and thus the buffer space may be timely freed.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," etc. indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including" and the like, when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal or UE having wireless communications capabilities, including but not limited to, mobile phones, cellular phones, smart phones, or personal digital assistants (PDAs), portable computers, image capture devices such as digital cameras, gaming devices, music storage and playback appliances and the like. In the following description, the terms "user equipment" or "UE" and "terminal device" may be used interchangeably. The terms "access node" or "AN" used herein may refer to a device or entity or a part thereof which is capable of establishing wireless communications with UEs so as to provide services to them and is also capable of establishing communications with an AGN or another AN. The terms "aggregation node" or "AGN" used herein may refer to a device or entity or a part thereof which is capable of connecting one or more ANs to a NC and LGW via wired connections. The AGN may additionally serve as an AN to provide services to UEs.

For illustrative purposes, the concept and principle of several embodiments of the present disclosure will be described in the context of mmW networks. Those skilled in the art will appreciate, however, that the concept and principle of the several embodiments of the present disclosure may be more generally applicable to any network in which access nodes may be densely deployed.

In order to solve part of the problems as mentioned in the Background, an alternative solution, referred to as a distributed control scheme, is proposed, where data packets would be delivered to multiple ANs around a specific UE, which may possibly become the serving AN of the specific UE in the near future (which will be referred to as standby ANs hereafter). These data packets may be buffered locally at these standby ANs (which will be referred to as pre-buffered data packets hereafter). Once the UE indicates to a standby AN that it is within the standby AN's coverage, the pre-buffered data packets at this AN will be sent to the UE. In this solution, the data flow is actually pre-prepared at network side, and the switching control is at UE side, as a balance between resource and latency of data transmission.

However, this solution fails to consider the limitation of buffer capacity of each AN. As for those packets that have been successfully received by the UE, it is not necessary to keep them in buffers of the standby ANs and shall be discarded so as to free the limited buffer space. Further, in this solution, a standby AN has no knowledge about the starting point, e.g. a packet number, from which packets shall be delivered to the UE that has just switched to it. It is obviously not desirable to deliver the packets from the very first one, which would surely cause additional latency to data transmission.

In some other technologies, like CDMA2000 Evolution-DataOnly (EV-DO), it has a concept of fast sector switching, which is based on that downlink data is duplicated to several nodes (which may be referred to as candidate cells), and a UE reports feedback information to all candidate cells that indicates which cell should transmit the data. Based on this concept, a solution on how to discard packets based on the direct UE report has been proposed in a Chinese patent application CN1878398A. However, this solution has some other drawbacks:

1) It requires that an uplink feedback can be received from the UE directly. Therefore, it is not applicable to a scenario where the packet discarding needs to be done before the UE switches to the target AN.

2) It requires that each AN has a capability to handle the feedback itself. However, it is not always the case. For example, if a re-transmission protocol (e.g., RLC) is only applicable between another network node and the UE, which is not visible by ANs, then when the UE switches to the target AN, even the UE reports a feedback, the target AN cannot handle or understand it. Or even the re-transmission protocol (e.g., RLC) is applicable to the target AN, but if the feedback is for the source AN, the target AN may not understand it either.

3) It requires a quick feedback as soon as the UE switches to the target AN. However it is not always the case. For example, in RLC, the UE may not send back RLC ACK to the AN directly when it switches to that AN as the triggering of RLC feedback has its own criterion. The AN may need to wait some time until the RLC ACK from the UE is sent out.

In order to solve at least some of the above problems and drawbacks, embodiments of the present disclosure provide a novel solution for facilitating mobility in a communications network, particularly in an ultra-dense network, which will be detailed hereafter with reference to FIGS. 2-8.

Figure 2:
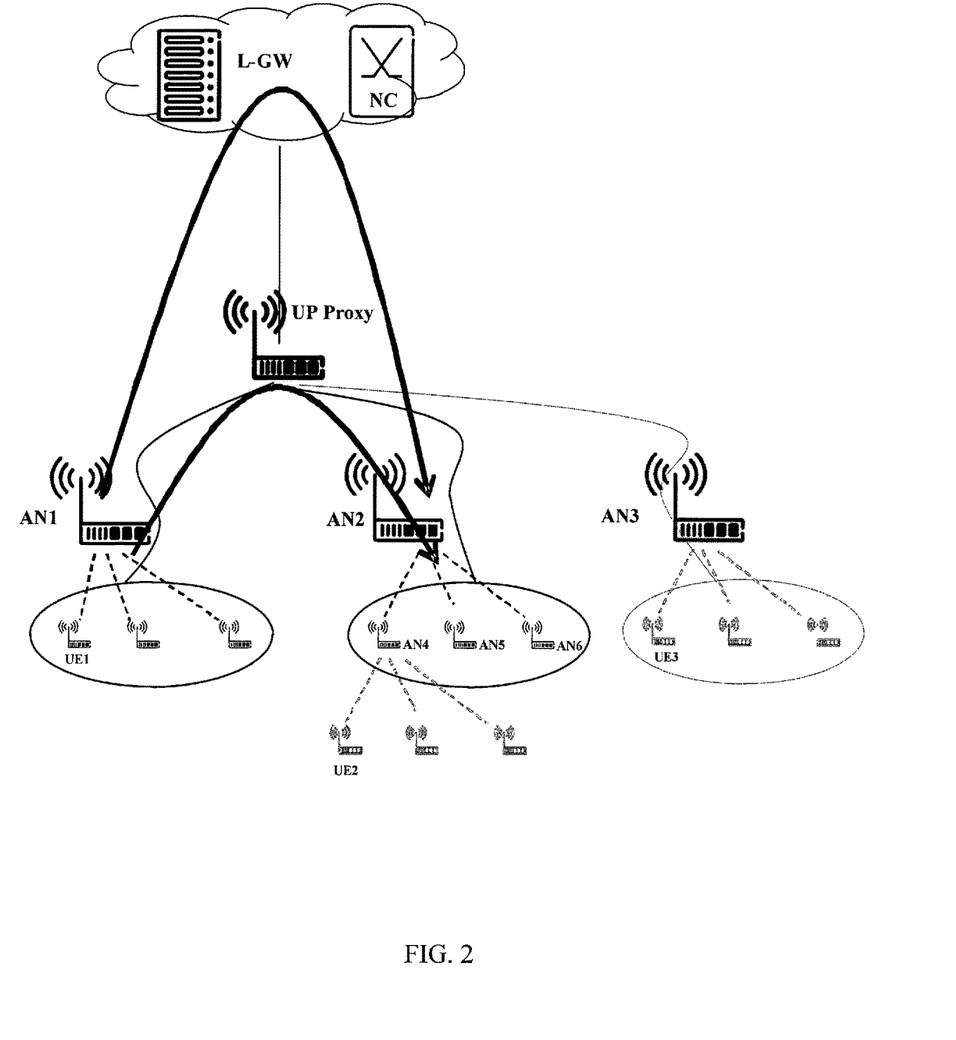
FIG. 2 illustrates a simplified mmW network according to embodiments of the present disclosure.

FIG. 2 illustrates a simplified mmW network in which a proxy for processing user plane data (which may be referred to as an UP proxy) is deployed closer to ANs than the LGW, so that the LGW may communicate data with the UP proxy, which in turn may communicate the data with AN1-AN3. This deployment of the UP proxy closer to ANs (e.g. AN1-AN3) itself may reduce the latency of data transmission by avoiding direct signaling and data to/from the LGW. The UP proxy may be embodied as an AN, an AGN or an independent entity.

Figure 3:
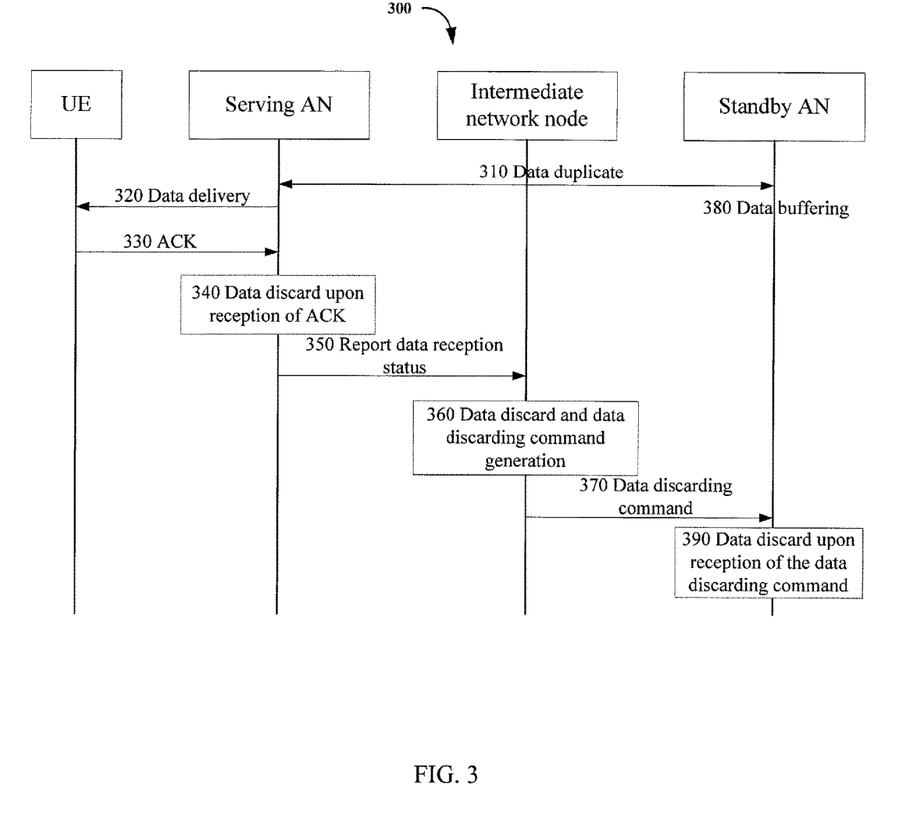
FIG. 3 illustrates an interactive flow chart of a method for facilitating mobility with a pre-buffering scheme according to embodiments of the present disclosure.

FIG. 3 illustrates an interactive flow chart of a method 300 for facilitating mobility with a pre-buffering scheme (i.e., buffering before switching) in a communications network, e.g. an mmW network as illustrated in FIG. 2, according to embodiments of the present disclosure. For better understanding rather than limiting of this method, interactive operations among the UE, serving AN, intermediate network node, and standby AN as illustrated in FIG. 3 will be described in correspondence to UE1, AN1, UP proxy, and AN2 as shown in FIG. 2.

In FIG. 2, UE 1 is currently served by AN1, which may correspond to the serving AN of FIG. 3; AN2 is a standby AN that may possibly become the serving AN of UE1 in the near future, which may correspond to the standby AN of FIG. 3; and the UP proxy connects to the LGW and receives data therefrom, which may correspond to the intermediate network node of FIG. 3. In the network as shown in FIG. 2, the LGW may be referred to as an upper level network node of the UP proxy, while AN1-AN3 may be referred to as lower level network nodes of the UP proxy.

Now referring back to FIG. 3, firstly at 310, the intermediate network node (e.g. the UP proxy of FIG. 2) transmits duplicates of data received from its upper level network node (e.g. the LGW of FIG. 2) and directed to the UE to the serving AN (e.g. AN1 of FIG. 2) and standby ANs (e.g. AN2 and AN3 of FIG. 2), although only one standby AN is illustrated in FIG. 3 as an example.

According to the embodiments of the present disclosure, the "standby" ANs for a specific UE refer to those ANs communicatively connected to the same intermediate network node, which may comprise: all ANs at the same level as the current serving AN of the specific UE; some ANs at the same level as the current serving AN that are located within a certain area around the specific UE; some ANs at the same level as the current serving AN that are physically neighboring to the current serving AN; some ANs at the same level as the current serving AN that may provide the UE with signal quality better than a certain threshold; or any set of ANs at the same level as the current serving AN comprising the AN that will become the serving AN of the specific UE in the near future, particularly the AN to which the UE will be switched next.

Then, at the serving AN, the data received from the intermediate network node is delivered at 320 to the UE and may also be buffered locally in case of possible retransmission requirements due to failure of reception at the UE. Once the data is successfully received at the UE, an acknowledgement (ACK) is sent back to the serving AN at 330.

Upon reception of the ACK, the serving AN may discard at 340 the data buffered locally and report a reception status at 350 to the intermediate network node indicating that the data is successfully received at the UE. In some cases, the report may not be in the same form as the ACK from the UE, since the re-transmission protocol (e.g., RLC) applied between the serving AN and the UE may be different from the one applied between the serving AN and the intermediate network node. Therefore, direct forwarding of the ACK to the intermediate network node may result in that the intermediate network node cannot understand or handle this forwarded ACK.

Correspondingly, if the UE fails to receive the data, a negative acknowledgement (NACK) may be sent back to the serving AN, which in turn initiates retransmission and also reports a reception status indicating the reception failure to the intermediate network node. Operations for the reception failure case follow the existing retransmission mechanism and thus will not be detailed herein for the sake of brevity.

Once the intermediate network node receives the reception status report indicating the success of data reception at the UE, it may discard at 360 the data that is successfully received at the UE and also report to its upper level network node, e.g. LGW, that the data is successfully delivered. As discussed above with regard to the reception status report of the serving AN, this report may not be in the same form as the reception status report of the serving AN in some cases due to different retransmission protocols applied.

Furthermore at 360, the intermediate network node generates a data discarding command according to the reception status report indicating the success of data reception at the UE. For example, the data discarding command may comprise an instruction for discarding the data buffered at the standby AN that has been successfully received at the UE and also comprise information that on one hand may indicate which data shall be discarded, and on the other hand for a standby AN to which the UE is actually switched, may indicate a starting point from which the data will be transmitted to the UE.

In addition, the generation of the data discarding command may be further based on overhead on a link between the intermediate network node and the standby AN, and a required update speed at the standby AN. For example, if the link overhead is high, the intermediate network node may wait for reception of more status reports and then generate one data discarding command according to aggregation of these reports. For another example, if the required update speed at the standby AN is high, which may be caused by an attribute of the data directed to the UE, for example, real-time voice data may require the data discarding command be generated more promptly than short messages, or caused by a load status of the serving area for the UE, for example, a heavier load may require the data discarding command be generated more promptly than a lower load, the intermediate network node may generate the command more frequently even if the link overhead is high. Preferably, the data discarding command may be generated in consideration of a balance of the link overhead and the required update speed at the standby AN. Furthermore, the generation of the data discarding command may also take into account channel quality of the UE. For example, worse channel quality of the UE may also require the data discarding command be generated more promptly than good channel quality, due to lower throughput at the air interface. Additionally, with consideration of one or more of the above factors, the data discarding command may be generated periodically before the UE switches to the standby AN or generated once during the switching.

Once the data discarding command is generated, it will be signaled to the standby ANs at 370. The data discarding command may be signaled to the standby ANs immediately after the generation. Alternatively, the data discarding command may be signaled periodically before the UE switches to one standby AN or signaled during the switching.

On the other side, the standby ANs firstly at 380 buffer the data received from the intermediate network node. Afterwards, in response to receiving the data discarding command from the intermediate network node, the standby ANs may discard at 390 the buffered data according to the data discarding command.

In the above description, the serving AN and standby AN, the intermediate network node and its upper level network node represent three levels of network nodes, which may correspond respectively to the AN1 and AN2, UP proxy and LGW as shown in FIG. 2. Those skilled in the art, however, shall understand that the AN1, AN2, and UP proxy plus the LGW in FIG. 2 are merely a simple example for the three levels of network nodes and that the method 300 may be more generally applicable to any three levels of network nodes in an mmW network.

As an example, the UP proxy of FIG. 2 may correspond to the upper level network node; AN2 may correspond to the intermediate network node; and AN4-AN6 may correspond to the serving and standby ANs at the lower level for UE2. In such an example, the network node AN2 of FIG. 2 may act as a standby AN for UE1 and also act as the intermediate network node for UE2 and thus may possess all functions for being both the standby AN and the intermediate network node as described above with reference FIG. 3. As another example, the LGW of FIG. 2 may act as the intermediate network node of FIG. 3. In such an example, the LGW may perform all operations of the intermediate network node as described above, e.g. receiving data from its own upper level node, e.g. in the core network, transmitting duplicates of the data to lower level network nodes AN1-AN3 of FIG. 2, receiving reception status report from AN1, generating and signaling a data discarding command according to the reception status report.

In most cases, an AN in an mmW network may act as the serving AN for some UEs and meanwhile act as the standby AN for some other UEs. For example, AN3 of FIG. 2 acts as the serving AN for UE3 and meanwhile acts as the standby AN for UE1. Therefore, such kind of ANs may possess all functionality for being both the standby AN and the serving AN as described above with reference FIG. 3.

By means of this method, data for transmission to a UE may be prepared in advance at standby ANs before the UE is switched to one of them and thus the latency for transmitting the data to the UE from the AN to which the UE is actually switched may be reduced. Furthermore, according to the information from the intermediate network node, e.g. the data discarding command, the AN to which the UE is actually switched may clearly know the starting point from which the data shall be delivered to the UE. Moreover, the data that has already been successfully received by the UE may be properly discarded from the buffer at the standby ANs and thus the buffer space may be timely freed.

In the following, the method 300 will be split and described individually with regard to various entities, e.g. the intermediate network node and the access node with reference to FIGS. 4 and 5.

Figure 4:
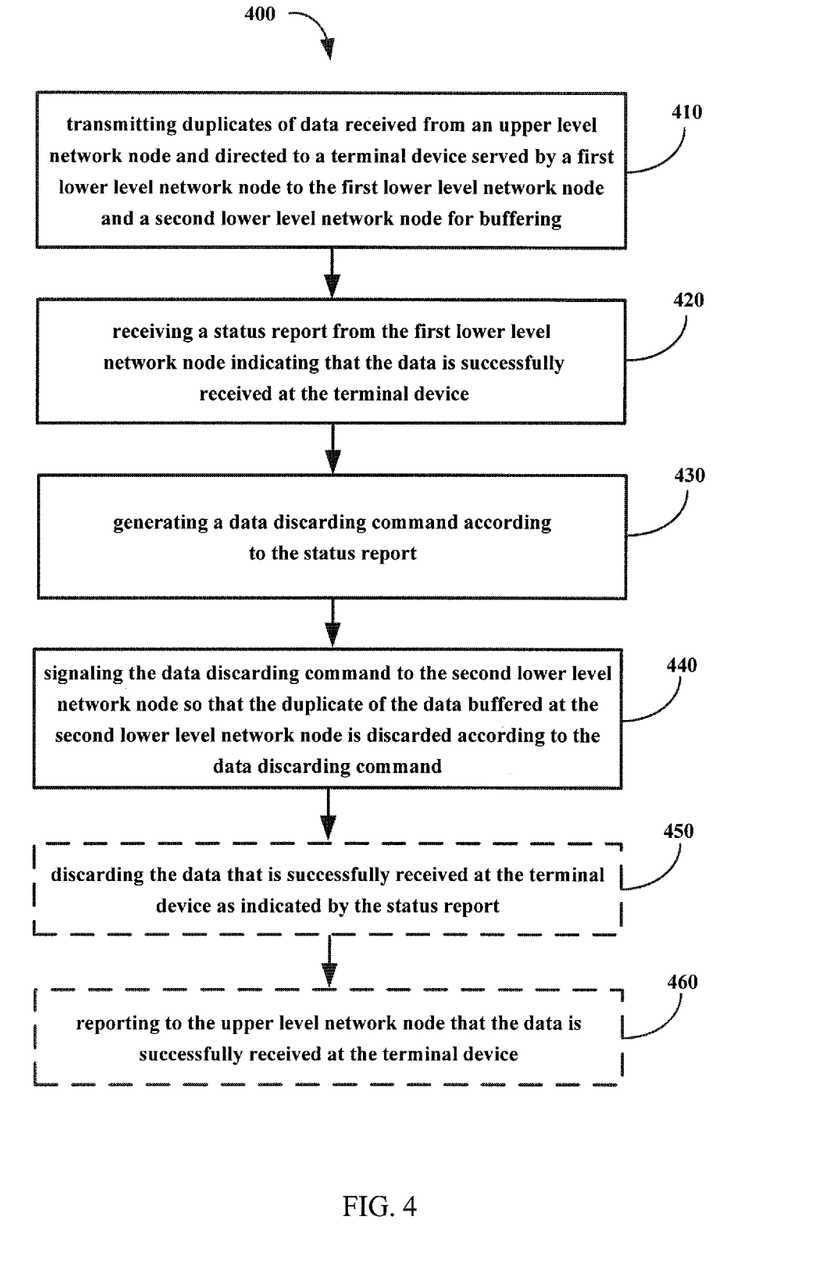
FIG. 4 illustrates a flowchart of a method for facilitating mobility in a communications network according to some embodiments of the present disclosure.

FIG. 4 illustrates a flowchart of a method 400 at a network node for facilitating mobility in a communications network according to some embodiments of the present disclosure. In an embodiment, the network node may correspond to the UP proxy of FIG. 2; and in another embodiment, the network node may correspond to AN2 of FIG. 2.

Particularly, as illustrated, the method 400 enters at block 410, in which the network node (e.g. the UP proxy of FIG. 2) transmits duplicates of data received from an upper level network node (e.g. the LGW of FIG. 2) and directed to a terminal device served by a first lower level network node (e.g. AN1 of FIG. 2) to the first lower level network node and a second lower level network node (e.g. AN2 and/or AN3 of FIG. 2) for buffering.

At block 420, the network node receives a status report from the first lower level network node indicating that the data is successfully received at the terminal device.

Then at block 430, the network node generates a data discarding command according to the status report and signals at block 440 the data discarding command to the second lower level network node so that the duplicate of the data buffered at the second lower level network node is discarded according to the data discarding command. In various embodiments, the data discarding command may be signaled to the second lower level network node periodically or during switching of the terminal device from the first lower level network node to the second lower level network node.

In an embodiment, the generation of the data discarding command may be further based on one or more of the following factors as discussed above with reference to FIG. 3: overhead on a link between the network node and the second lower level network node, a required update speed at the second lower level network node, an attribute of the data directed to the terminal device, a load status of the terminal device, and channel quality of the terminal device.

In an embodiment that the network node acts as both the intermediate network node and the standby access node for different terminal devices, e.g. AN2 of FIG. 2, the network node may also discard, at block 450, the data that is successfully received at the terminal device as indicated by the status report and report at block 460 to the upper level network node that the data is successfully received at the terminal device.

In an embodiment, the first lower level network node may be an access node directly serving the terminal device. In another embodiment, the first lower level network node may be a network node between the upper level network node and the access node directly serving the terminal device.

Figure 5:
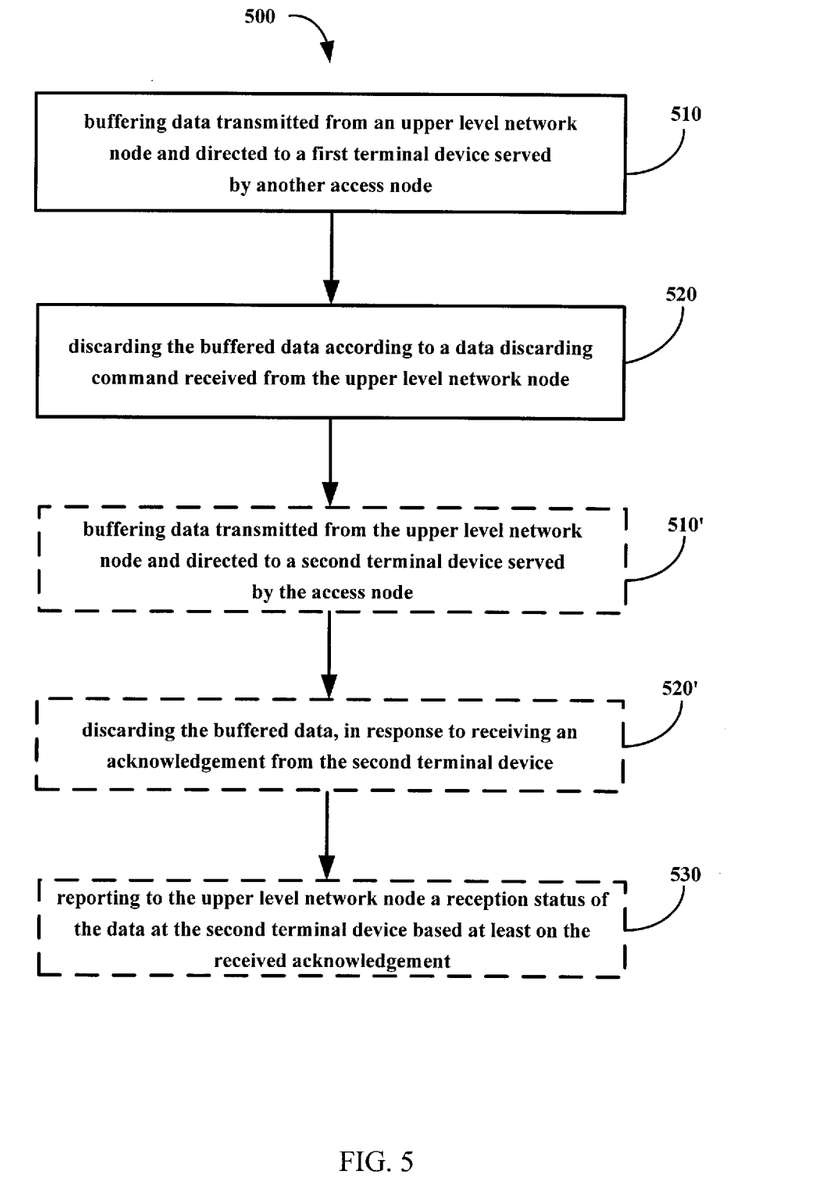
FIG. 5 illustrates a flowchart of a method for facilitating mobility in a communications network according to some other embodiments of the present disclosure.

FIG. 5 illustrates a flowchart of a method 500 at an access node for facilitating mobility in a communications network according to embodiments of the present disclosure.

As illustrated, the method 500 enters at block 510, in which the access node that may be a standby AN (e.g. AN2 of FIG. 2) buffers data transmitted from an upper level network node (e.g. the UP proxy of FIG. 2) and directed to a first terminal device (e.g. UE1 of FIG. 2) served by another access node (e.g. AN1 of FIG. 2). Further, the access node discards, at block 520, the buffered data according to a data discarding command received from the upper level network node.

As discussed above with reference to FIG. 3, the data discarding command may be generated at the upper level network node based on a status report from the other network node indicating that the data is successfully received at the first terminal device.

In some embodiments, the access node may simultaneously act as a serving AN for other terminal devices. For example, AN3 of FIG. 2 may act as a standby AN for UE1 and meanwhile act as a serving AN for UE3. In these embodiments, the access node may also need to buffer data transmitted from the upper level network node and directed to a second terminal device (e.g. UE3 of FIG. 3) served by the access node itself at block 510'. Furthermore, the access node may discard at block 520' the buffered data, in response to receiving an acknowledgement from the second terminal device and also reporting at block 530 to the upper level network node a reception status of the data at the second terminal device based at least on the received acknowledgement. As discussed above with reference to FIG. 3, the status report may take a different form from the received acknowledgement so that the upper level network can handle and understand it even when different retransmission protocols are applied for two hops, i.e. one hop between the second terminal device and the access node and the other hop between the access node and the upper level network node.

Those skilled in the art shall understand that the operations in FIGS. 4 and 5 may not necessarily be performed in the illustrated order. Some operations may be performed in parallel or in a reverse order. For example, the operations in blocks 430 and 450 of FIG. 4 may be performed in parallel and the operations in blocks 450 and 460 may be performed in parallel or in a reverse order. The operations in blocks 510 and 510' may also be performed in parallel.

Figure 6:
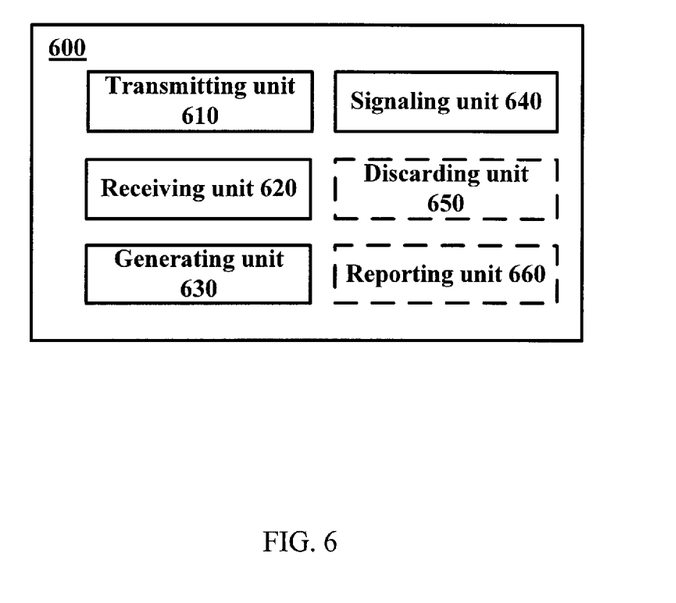
FIG. 6 illustrates a schematic block diagram of an apparatus for facilitating mobility according to some embodiments of the present disclosure.

FIG. 6 illustrates a schematic block diagram of an apparatus 600 for facilitating mobility in a communications network, e.g. an mmW network, according to some embodiments of the present disclosure. The apparatus 600 may be embodied as the intermediate network node, e.g. AN, or a part thereof.

Particularly, the apparatus 600 comprises a transmitting unit 610, a receiving unit 620, a generating unit 630 and a signaling unit 640.

The transmitting unit 610 is configured to transmit duplicates of data received from an upper level network node and directed to a terminal device served by a first lower level network node to the first lower level network node and a second lower level network node for buffering. The receiving unit 620 is configured to receive a status report from the first lower level network node indicating that the data is successfully received at the terminal device. The generating unit 630 is configured to generate a data discarding command according to the status report. The signaling unit 640 is configured to signal the data discarding command to the second lower level network node so that the duplicate of the data buffered at the second lower level network node is discarded according to the data discarding command. The data discarding command may be signaled by the signaling unit 640 periodically or during switching of the terminal device from the first lower level network node to the second lower level network node.

In an embodiment, the generating unit 630 is configured to generate the data discarding command based further on one or more of the following factors as discussed above with reference to FIG. 3: overhead on a link between the network node and the second lower level network node, a required update speed at the second lower level network node, an attribute of the data directed to the terminal device, a load status of the terminal device, and channel quality of the terminal device.

In an embodiment, the apparatus may further comprise a discarding unit 650 configured to discard the data that is successfully received at the terminal device as indicated by the status report and a reporting unit 660 configured to report to the upper level network node that the data is successfully received at the terminal device.

In some embodiments, the first lower level network node may be an access node directly serving the terminal device. In some other embodiments, the first lower level network node may be a network node between the upper level network node and an access node directly serving the terminal device.

The above units 610-660 may be configured to implement corresponding operations or steps of method 400 as described with reference to FIG. 4 and thus will not be detailed herein for the conciseness purpose.

Figure 7:
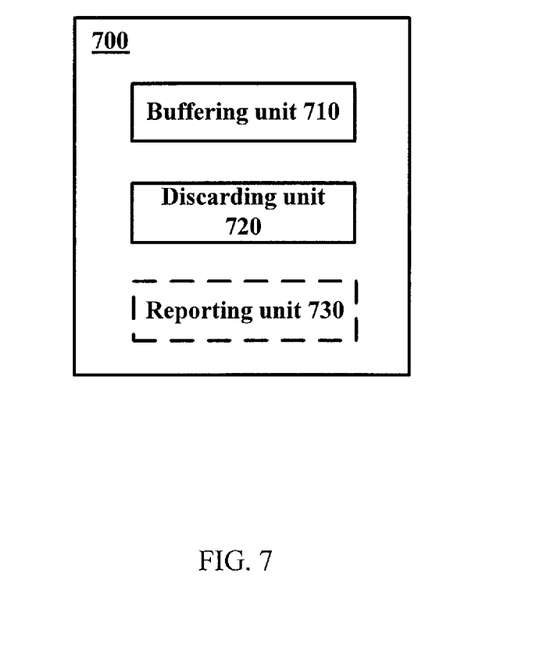
FIG. 7 illustrates a schematic block diagram of an apparatus for facilitating mobility in a communications network according to some other embodiments of the present disclosure.

FIG. 7 illustrates a schematic block diagram of an apparatus 700 for facilitating mobility in a communications network, e.g. an mmW network, according to some other embodiments of the present disclosure.

Particularly, the apparatus 700 comprises a buffering unit 710 and a discarding unit 720. The buffering unit 710 is configured to buffer data transmitted from an upper level network node and directed to a first terminal device served by another access node. The discarding unit 720 is configured to discard the buffered data according to a data discarding command received from the upper level network node.

As discussed above with reference to FIG. 3, the data discarding command may be generated at the upper level network node based on a status report from the other network node indicating that the data is successfully received at the first terminal device.

In an embodiment that the access node may simultaneously act as a serving access node for a second terminal device, the buffering unit 710 may be further configured to buffer data transmitted from the upper level network node and directed to a second terminal device served by the access node. The discarding unit 720 may be further configured to discard the buffered data, in response to receiving an acknowledgement from the second terminal device. In addition, the apparatus 700 may further comprise a reporting unit 730 that is configured to report to the upper level network node a reception status of the data at the second terminal device based at least on the received acknowledgement.

The above units 710-730 may be configured to implement corresponding operations or steps of method 500 as described with reference to FIG. 5 and thus will not be detailed herein for the conciseness purpose.

Figure 8:
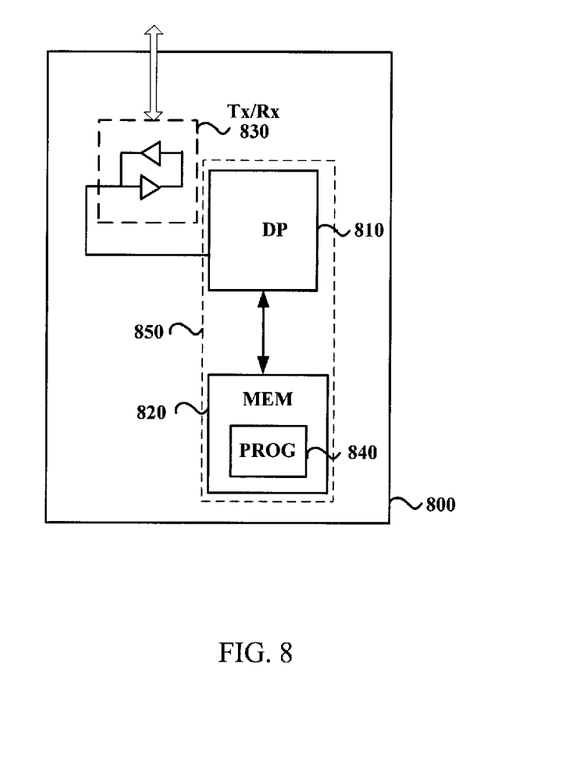
FIG. 8 illustrates a schematic block diagram of another apparatus for facilitating mobility in a communications network according to embodiments of the present disclosure.

FIG. 8 illustrates a schematic block diagram of an apparatus 800 for facilitating mobility in a communications network, particularly an ultra-dense network, e.g. an mmW network. The apparatus 800 may be embodied as a network node, e.g. the intermediate network node of FIG. 3, such as the UP proxy of FIG. 2, or a part of the network node. The apparatus 800 may be embodied as an access node, e.g. AN2 or AN3 of FIG. 2, or a part thereof.

Particularly, the apparatus 800 comprises at least one processor 810, such as a data processor (DP) and at least one memory (MEM) 820 coupled to the processor 810. The apparatus 800 may further comprise a transmitter TX and receiver RX 830 coupled to the processor 810 for establishing communications with other network nodes or terminal devices. The MEM 820 stores a program (PROG) 840. When the apparatus 800 is embodied as the intermediate network node, e.g. the UP proxy of FIG. 2, the PROG 840 may include instructions that, when executed on the associated processor 810, enable the apparatus 800 to operate in accordance with the embodiments of the present disclosure as described above with reference to FIG. 4, for example to perform method 400. When the apparatus 800 is embodied as the access node, e.g. AN2 or AN3 of FIG. 2 or a part thereof, the PROG 840 may include instructions that, when executed on the associated processor 810, enable the apparatus 800 to operate in accordance with the embodiments of the present disclosure as described above with reference to FIG. 5, for example to perform method 500.

A combination of the at least one processor 810 and the at least one MEM 820 may form processing means 850. When the apparatus 800 is embodied as the network node, e.g. the UP proxy of FIG. 2, the processing means 850 may be adapted to implement the embodiments of the present disclosure as described above with reference to FIG. 4; while the apparatus 800 is embodied as the access node, e.g. AN2 of AN3 of FIG. 2 or a part thereof, the processing means 850 may be adapted to implement the embodiments of the present disclosure as described above with reference to FIG. 5.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 810 may be of any type suitable to the local technical environment, and may include one or more of general purpose computers, special purpose computers, microprocessors, digital signal processors (DSPs) and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed at a network node for facilitating mobility in a communications network, the method comprising:

transmitting, duplicates of data received from an upper level network node and directed to a terminal device served by a first lower level network node to the first lower level network node and a second lower level network node for buffering;

receiving a status report from the first lower level network node indicating that the data is successfully received at the terminal device;

generating a data discarding command according to the status report;

signaling the data discarding command to the second lower level network node;

discarding the data that is successfully received at the terminal device as indicated by the status report; and reporting to the upper level network node that the data is successfully received at the terminal device.

2. The method according to claim 1, wherein the generation of the data discarding command is further based on one or more of the following: an overhead on a link between the network node and the second lower level network node, a required update speed at the second lower level network node, an attribute of the data directed to the terminal device, a load status of the terminal device, and channel quality of the terminal device.

3. The method according to claim 1, wherein:

the data discarding command is signaled to the second lower level network node periodically; or the data discarding command is signaled to the second lower level network node during switching of the terminal device from the first lower level network node to the second lower level network node.

4. The method according to claim 1, wherein the first lower level network node is an access node directly serving the terminal device or a network node between the upper level network node and an access node directly serving the terminal device.

5. The method according to claim 1, wherein the data discarding command comprises information indicating a starting point from which the data will be transmitted to the terminal device.

6. A method performed at an access node for facilitating mobility in a communications network, the method comprising:

buffering data transmitted from an upper level network node and directed to a first terminal device served by another access node;

discarding the buffered data directed to the first terminal device, according to a data discarding command received from the upper level network node;

buffering data transmitted from the upper level network node and directed to a second terminal device served by the access node;

discarding the buffered data directed to the second terminal device, in response to receiving an acknowledgement from the second terminal device; and reporting, to the upper level network node, a reception status of the data at the second terminal device based at least on the received acknowledgement.

7. The method according to claim 6, wherein the data discarding command is generated based on a status report from another network node indicating that the data is successfully received at the first terminal device.

8. An apparatus for facilitating mobility in a communications network, the apparatus comprising:

a transmitter configured to transmit, duplicates of data received from an upper level network node and directed to a terminal device served by a first lower level network node to the first lower level network node and a second lower level network node for buffering;

a receiver configured to receive a status report from the first lower level network node indicating that the data is successfully received at the terminal device; and one or more processors configured to:

generate a data discarding command according to the status report;

signal the data discarding command to the second lower level network node;

discard the data that is successfully received at the terminal device as indicated by the status report; and report to the upper level network node that the data is successfully received at the terminal device.

9. The apparatus according to claim 8, wherein the apparatus is a network node, and wherein the one or more processors are configured to generate the data discarding command further based on one or more of the following: an overhead on a link between the network node and the second lower level network node, a required update speed at the second lower level network node, an attribute of the data directed to the terminal device, a load status of the terminal device, and channel quality of the terminal device.

10. The apparatus according to claim 8, wherein the one or more processors are configured to:

signal the data discarding command to the second lower level network node periodically, or signal the data discarding command to the second lower level network node during switching of the terminal device from the first lower level network node to the second lower level network node.

11. The apparatus according to claim 8, wherein the first lower level network node is an access node directly serving the terminal device or a network node between the upper level network node and an access node directly serving the terminal device.

12. The apparatus according to claim 8, wherein the data discarding command comprises information indicating a starting point from which the data will be transmitted to the terminal device.

13. An apparatus for facilitating mobility in a communications network, the apparatus comprising one or more processors configured to:

buffer data transmitted from an upper level network node and directed to a first terminal device served by another access node;

discard the buffered data directed to the first terminal device, according to a data discarding command received from the upper level network node;

buffer data transmitted from the upper level network node and directed to a second terminal device served by the access node;

discard the buffered data directed to the second terminal device, in response to receiving an acknowledgement from the second terminal device; and report, to the upper level network node, a reception status of the data at the second terminal device based at least on the received acknowledgement.

14. The apparatus according to claim 13, wherein the data discarding command is generated based on a status report from another network node indicating that the data is successfully received at the first terminal device.

* * * * *